United States Patent [19]
Nagahori

[11] Patent Number: 5,539,779
[45] Date of Patent: Jul. 23, 1996

[54] AUTOMATIC OFFSET CONTROL CIRCUIT FOR DIGITAL RECEIVER

[75] Inventor: Takeshi Nagahori, Tokyo, Japan

[73] Assignee: NEC Corporation, Japan

[21] Appl. No.: 228,819

[22] Filed: Apr. 18, 1994

[30] Foreign Application Priority Data

Apr. 20, 1993 [JP] Japan ................... 5-091748

[51] Int. Cl.⁶ ............................................. H04L 25/06
[52] U.S. Cl. .................... 375/317; 375/319; 375/345; 330/260; 329/319; 329/350; 327/60; 327/73; 327/307; 327/323
[58] Field of Search ........................... 375/258, 259, 375/317–319, 346, 285, 286, 345; 328/162, 165, 167; 329/318, 319, 349–353; 327/58,62, 74, 68, 72, 50–52, 54, 56, 60, 72, 73, 306, 307, 309, 310, 312, 317, 323; 455/303, 306; 330/259–261

[56] References Cited

U.S. PATENT DOCUMENTS

| | | | |
|---|---|---|---|
| 5,025,251 | 6/1991 | Mittel et al. | 375/317 |
| 5,052,021 | 9/1991 | Goto et al. | 375/317 |
| 5,412,692 | 5/1995 | Uchida | 375/317 |

FOREIGN PATENT DOCUMENTS

0430707  11/1990  European Pat. Off. ........ G01R 19/30

OTHER PUBLICATIONS

Journal of Lightwave Technology., vol. 8, No. 12, Dec. 1990, New York U.S. pp. 1897–1903.
Patent Abstracts of Japan., vol. 17, No. 183.
"DC Coupled Burst Mode Optical Receiver with High Speed ATC Circuit", Takeshi Nagahori and Kazuhisa Kaede, Opto–Electronics Research Laboratories, Jul. 1992, p. 4–110.

*Primary Examiner*—Stephen Chin
*Assistant Examiner*—Amanda T. Le
*Attorney, Agent, or Firm*—Laff, Whitesel, Conte & Saret

[57] ABSTRACT

An automatic offset control circuit comprises a differential output preamplifier having an offset adjustment function, further comprising an average detector, a peak detector, and a differential input amplifier. The average detector generates a reference voltage representing an average value of a positive output and a negative output of the preamplifier. The peak detector outputs a peak voltage representing a peak of the negative output of the preamplifier. The differential input amplifier compares the peak voltage with the reference voltage to output an offset adjustment signal to the preamplifier. The offset adjustment signal is obtained based on a difference between the reference voltage and the peak voltage. A bottom detector may be used instead of the peak detector, provided a bottom value is detected using the positive output of the preamplifier.

13 Claims, 9 Drawing Sheets

AUTOMATIC OFFSET CONTROL CIRCUIT FOR DIGITAL RECEIVER

FIELD OF THE INVENTION

The present invention relates to an automatic offset control circuit for a digital receiver in a digital transmission system such as an optical subscriber transmission system, an optical local area network (LAN), or an optical interconnection apparatus.

BACKGROUND OF THE INVENTION

In general, an optical digital receiver is comprised of a photodetector module and a monolithic integrated circuit for receiving the detected signal to regenerate it. Since the integrated circuit includes amplifiers which are direct-current coupled, it is very important to solve the offset-voltage problem stemming from variation of its power supply voltage and ambient temperature.

Figure 1:
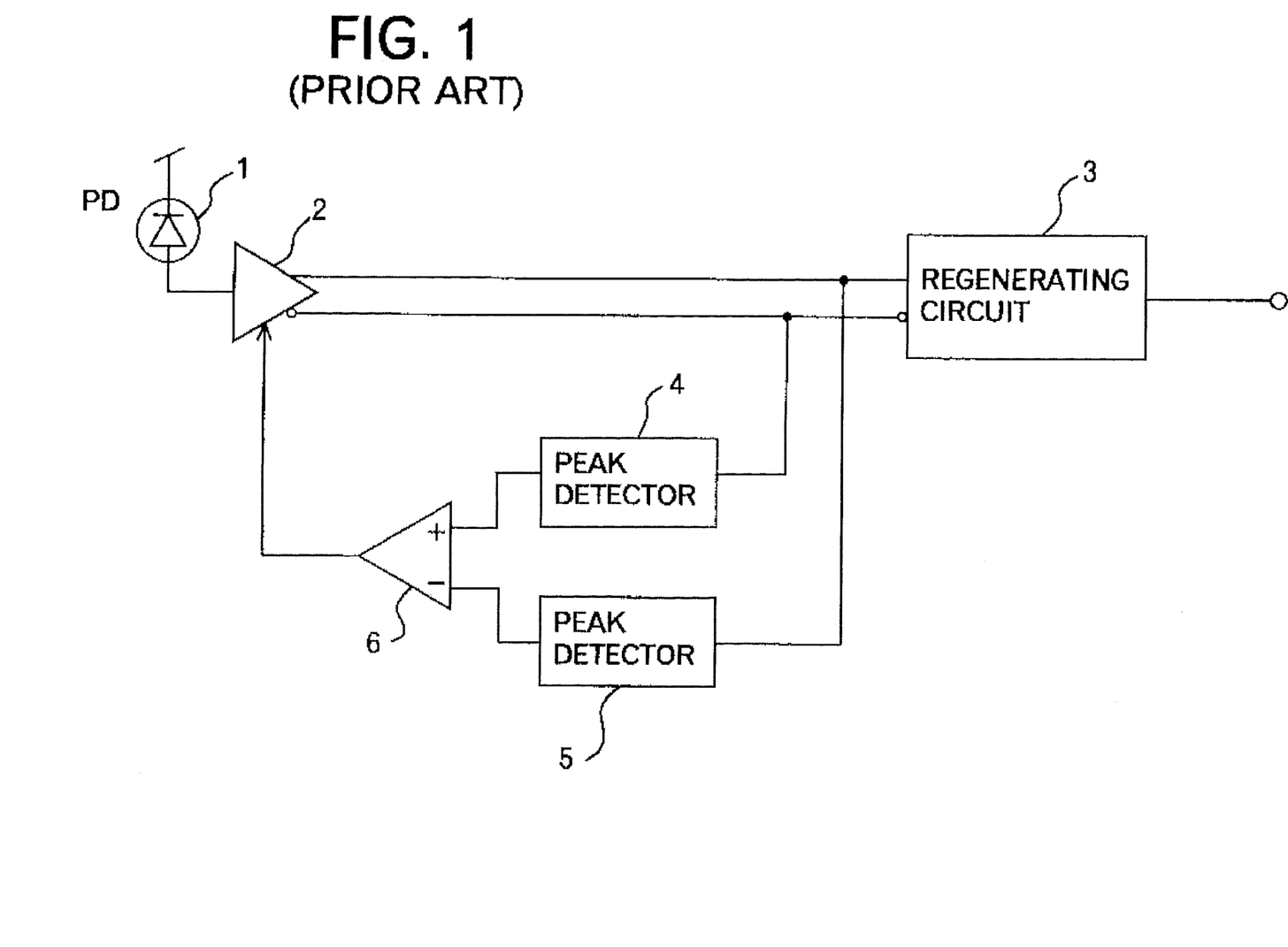
FIG. 1 is a block diagram illustrating a digital receiver suitable for continuous signals employing a first conventional offset control circuit.

FIG. 1 is a block diagram illustrating the structure of a conventional optical receiver for continuous signals which is widely used. The signal detected by the photodetector 1 is amplified by a differential output preamplifier 2 and then regenerated by a regenerating circuit 3. The optical receiver employs an automatic offset control circuit comprising peak detectors 6,7 and a differential input amplifier 6. The peak detectors 6 and 7 detect peak values of positive and negative output voltages of a preamplifier 2, respectively. The differential input amplifier 6 receives the peak values and outputs the difference voltage between these values to the preamplifier 2 to cancel out an offset voltage thereof.

Figure 9A:
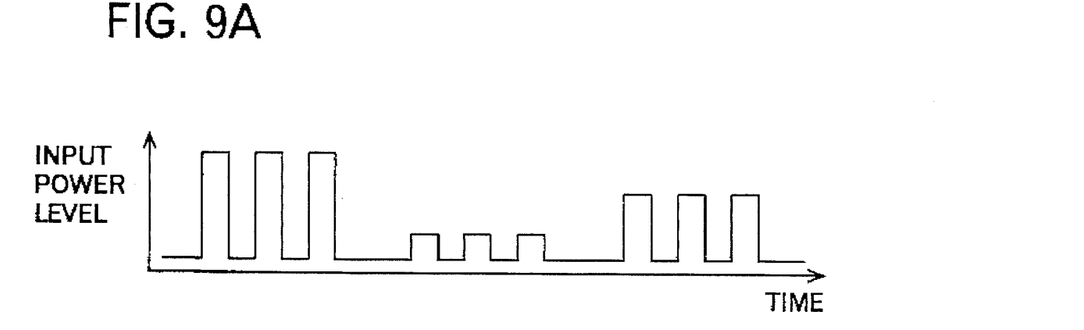
FIG. 9A is a waveform chart illustrating an input burst signal of the preamplifier to be controlled by the automatic offset control circuit.
Figure 9B:
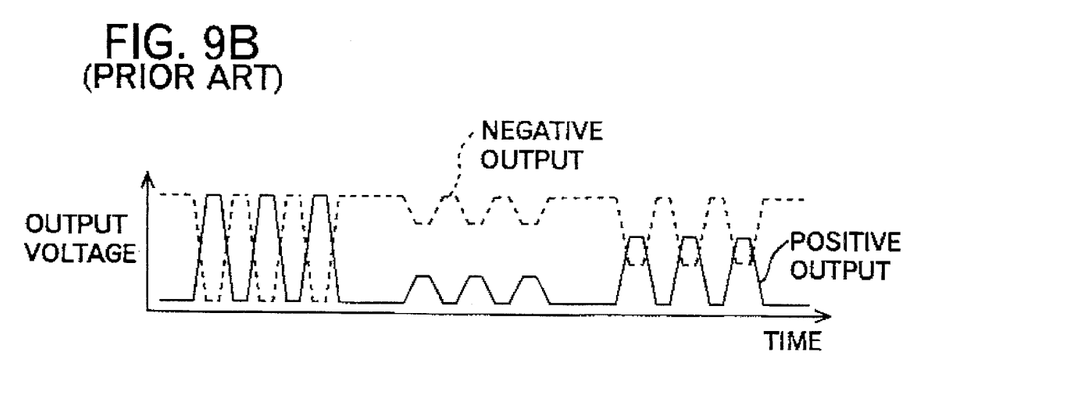
FIG. 9B is a waveform chart illustrating an output signal of the preamplifier controlled by the first conventional automatic offset control circuit.

However, the above-mentioned control is inappropriate for burst signals as shown in FIG. 9A with power level subject to more rapid changes than the time constant of the automatic offset control circuit. The reason is that the offset control is properly performed only for pulse series having the maximum power level within a period equal to the time constant of the automatic offset control circuit as shown in FIG. 9B, so that other pulse series may have a high probability of being recognized as space by the regenerating circuit 3.

Figure 2:
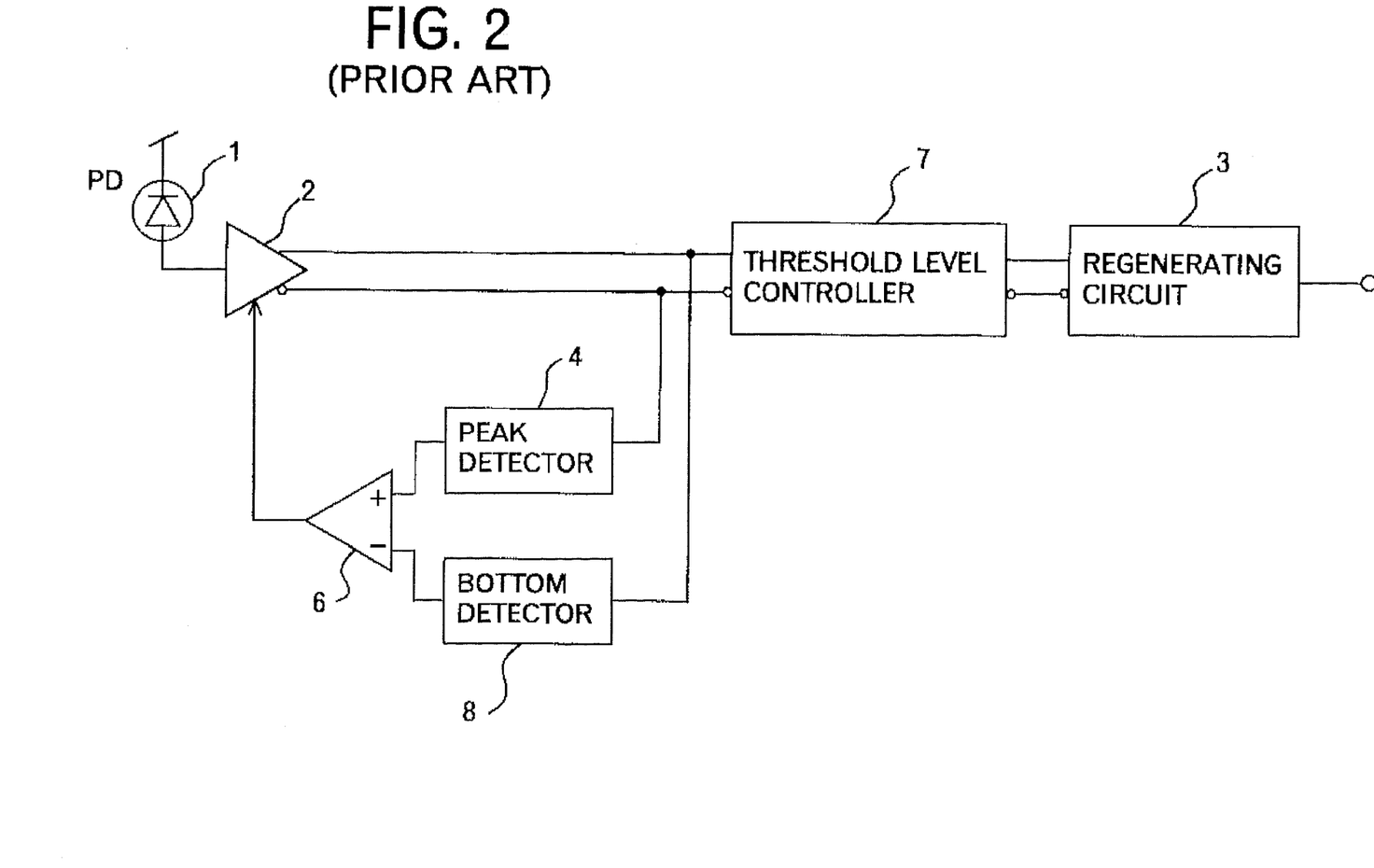
FIG. 2 is a block diagram illustrating an optical receiver suitable for burst signals employing second conventional offset control circuit.
Figure 3:
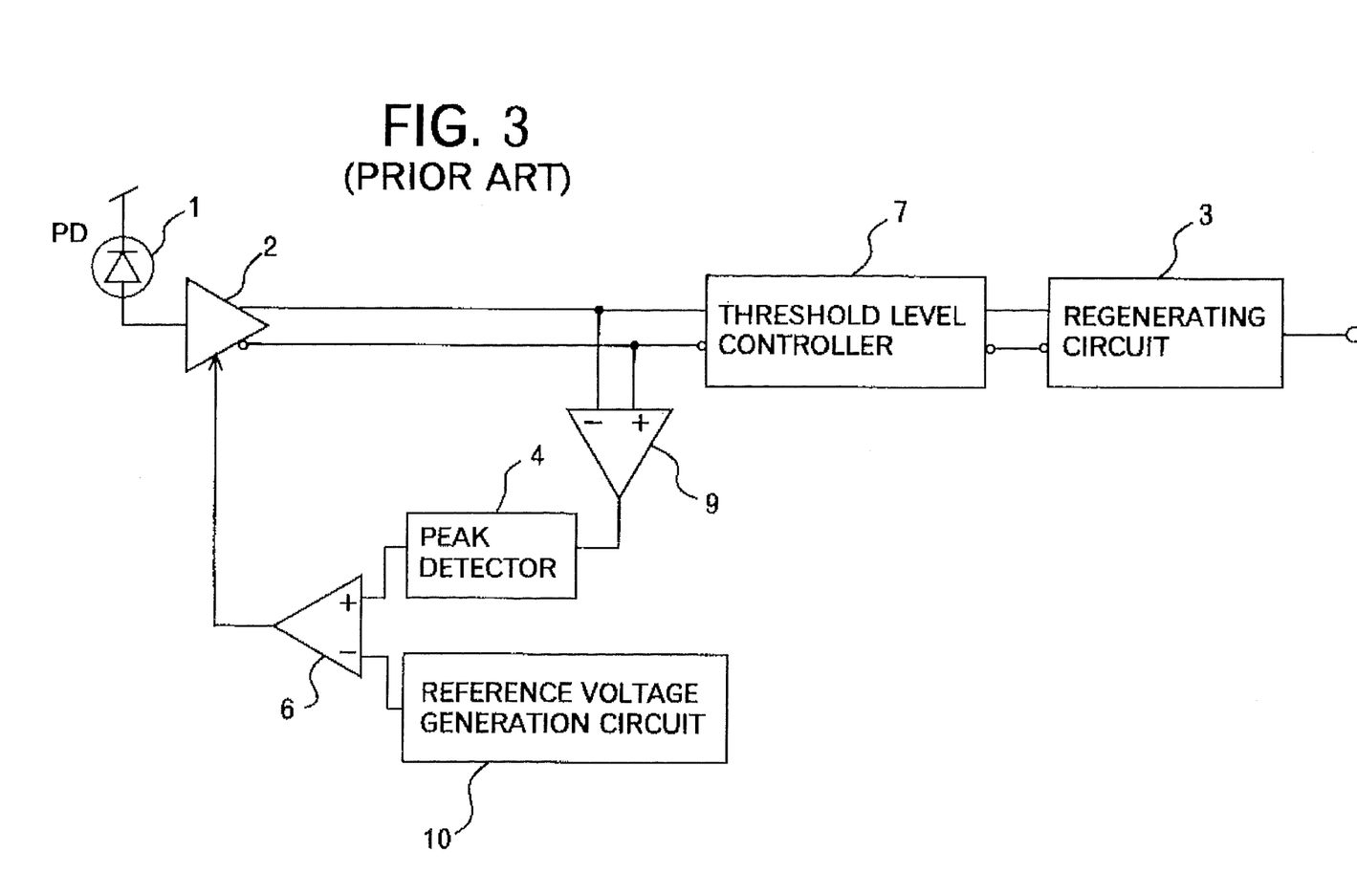
FIG. 3 is a block diagram illustrating an optical receiver suitable for burst signals employing third conventional offset control circuit.

FIG. 2 is a block diagram illustrating a conventional basic structure of an optical receiver suitable for burst signals. FIG. 3 is a block diagram showing a conventional embodiment of such an optical receiver. The receiver shown in FIG. 2 employs an automatic offset control circuit comprising the peak detector 4, a bottom detector 8 and the differential input amplifier 6. The peak detector 6 detects a peak value of negative output of the preamplifier 2 and the bottom detector 8 detects a bottom value of positive output thereof.

Figure 9C:
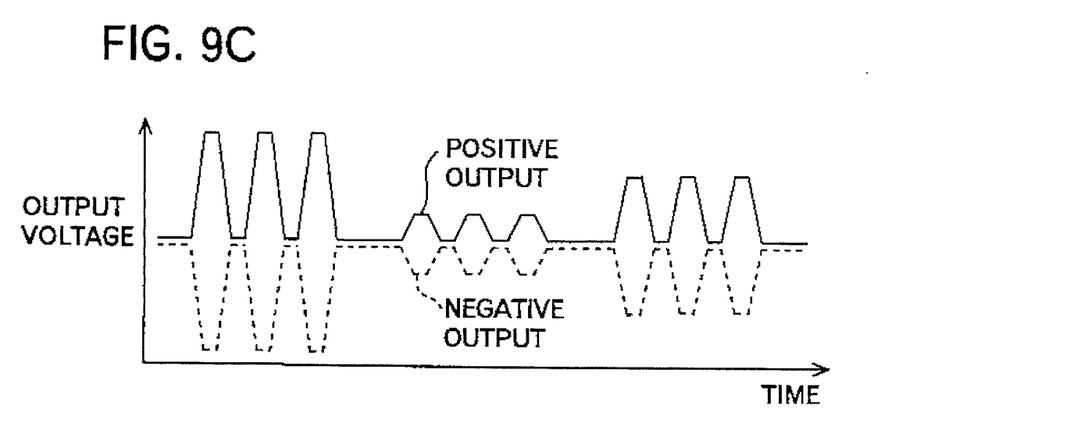
FIG. 9C is a waveform chart illustrating an output signal of the preamplifier controlled by the invention or the second and third conventional automatic offset control circuit.

Such an offset control is suitable for a burst signal with a power level subject to more rapid changes than the time constant of the automatic offset control circuit as shown in FIG. 9A. The offset control makes it possible to keep the difference between the positive and negative output voltages of the preamplifier 2 constant in value when receiving no input digital signal or the lowest level signal of the input digital signal as shown in FIG. 9C. Therefore, the burst pulse series emitted from the preamplifier 2 are all correctly recognized as either a mark or space by using the threshold level controller 7 and the regenerating circuit 3.

However, the structure shown in FIG. 2 is difficult to be realized because both the peak detector 4 and the bottom detector 8 are required to have a high precision and the same offset characteristic.

In order to avoid such difficulty, a configuration as shown in FIG. 3 is proposed (Tran. of National Meeting of the Institute of Electronics, Information and Communication Engineers (IEICE), Fall, 1992, Vol. 4, page 110). In FIG. 3, the offset control circuit is comprised of a booster amplifier 9, the peak detector 4, a reference voltage generation circuit 10 and the differential input amplifier 6. This circuit can obtain the waveform shown in FIG. 9C as well. The booster amplifier 10 inserted between the preamplifier 2 and the peak detector 4 reduces the influence of the offset of the peak detector 4 upon the output of the amplifier 2.

However, in this offset control circuit, output variation of the peak detector 4 caused by power supply and temperature variations must be equal to that of the reference voltage generation circuit 10. Therefore, an additional compensating circuit is required, resulting in the increased number of circuit elements.

SUMMARY OF THE INVENTION

It is an object of the present invention to provide an automatic offset control circuit for a digital receiver capable of receiving a burst signal wherein the number of required circuit elements is small and the output offset is substantially cancelled out.

An automatic offset control circuit is comprised of a differential output preamplifier which has an offset adjustment function. The preamplifier receives an input digital signal and outputs a positive output signal and a negative output signal. The circuit is further comprised of an average detector, a peak detector, and a differential input amplifier.

The average detector detects an average value of a positive output signal and a negative output signal of the preamplifier. The average value serves as a reference value. A differential input/output booster amplifier may be inserted between the preamplifier and the average detector. The average detector is preferably comprised of a voltage divider comprising resistors having the same resistance. The peak detector detects a peak value of the negative output signal of the preamplifier. The differential input amplifier compares the peak value with the average value (or the reference value) and outputs an offset adjustment signal to the preamplifier. The offset adjustment signal is obtained based on a difference between the average value and the peak value.

In another aspect of the invention, a bottom detector may be used instead of the peak detector, provided a bottom value is detected using the positive output signal.

DETAILED DESCRIPTION OF THE PREFERRED EMBODIMENT

Figure 4:
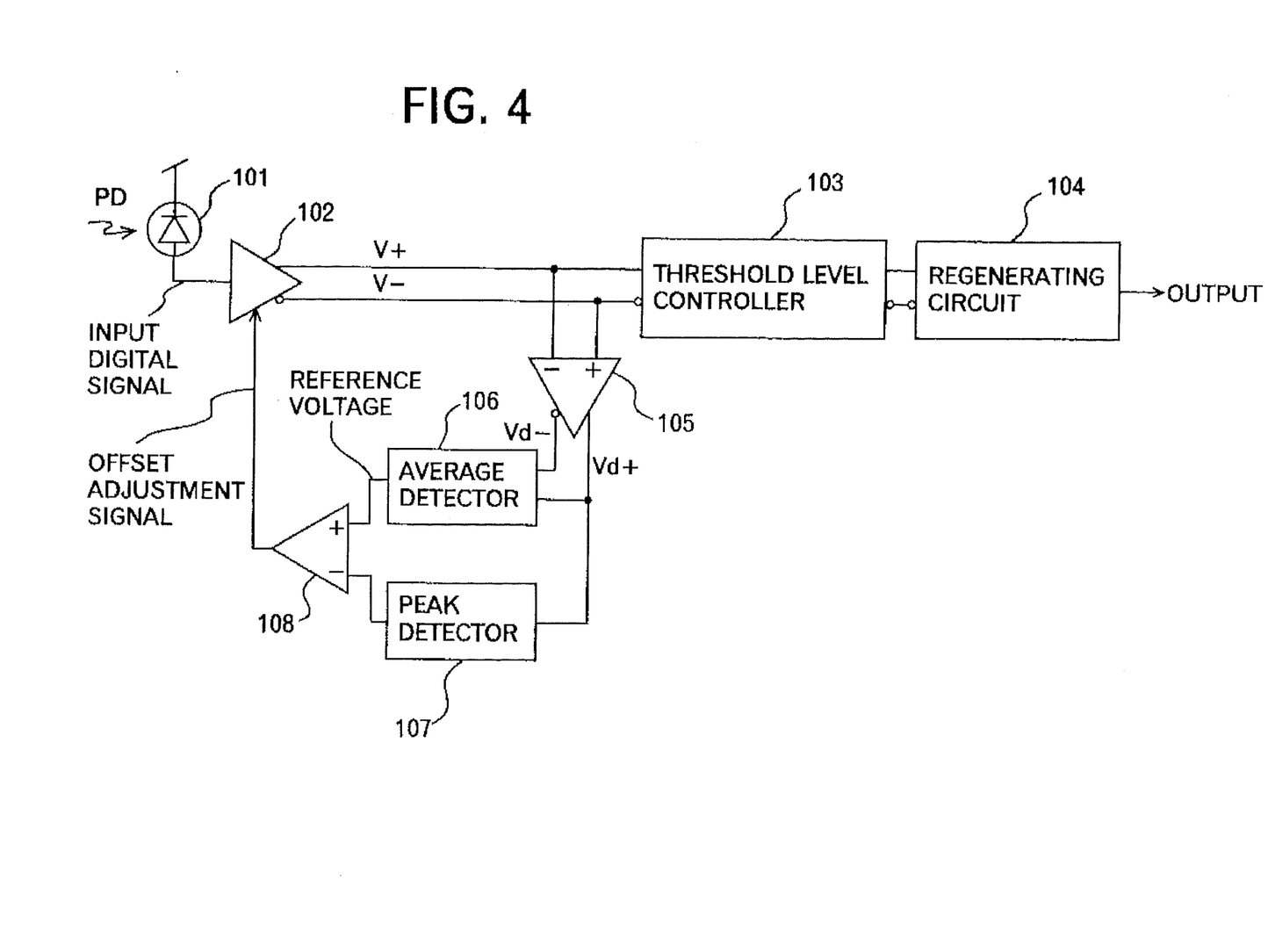
FIG. 4 is a block diagram illustrating the structure of an optical receiver employing a first embodiment according to the invention.

Referring to FIG. 4, a photodetector 101 is a photodiode used to convert an input digital optical signal to an electrical current, and is connected to the differential output preamplifier 102 to convert the current to a voltage. The preamplifier 102 has an offset adjustment function to adjust an output voltage thereof on a constant value when receiving no signal or a signal with the lowest level bits of the input digital signal. The output of the preamplifier 102 is input to a threshold level controller 103 followed by a regenerating circuit 104 as well as a differential input/output booster amplifier 105. The output of the preamplifier 102 is comprised of the positive output V+ and the negative output V−.

The positive (non-inverting) input terminal of the booster amplifier 105 is connected to the negative output terminal of the preamplifier 102 while the negative (inverting) input terminal of the booster amplifier 105 is connected to the positive output terminal of the preamplifier 102. The positive output Vd+ and the negative output Vd− of the booster amplifier 105 are input to an average detector 106 which detects the average of the output voltages, Vd+ and Vd−, of the booster amplifier 105 as a reference voltage. The positive output Vd+ of the booster amplifier 105 is input to a peak detector 107 where the peak voltage of the output Vd+ is detected.

The positive input terminal of a differential input amplifier 108 is connected to the output terminal of the average detector 106 and the negative input terminal of the differential input amplifier 108 is connected to the output terminal of the peak detector 107. The output terminal of the differential input amplifier 108 is connected to the offset adjustment terminal of the preamplifier 102. The differential input amplifier 108 outputs the differential voltage between the average voltage and the peak voltage as an offset adjustment signal to the preamplifier 102. In this manner, a feedback loop for offset control is formed which is comprised of the preamplifier 102, the booster amplifier 105, the average detector 106, the peak detector 107, and the differential input amplifier 108.

The output of the average detector 106 serves as a reference voltage because the average value of the positive and the negative output voltages of the booster amplifier 105 is a constant DC value, regardless of the magnitude of the input power level of the digital optical signal detected by the photodetector 101.

In addition, the positive input terminal of the booster amplifier 105 is connected to the negative output terminal of the preamplifier 102, and the positive output terminal of the booster amplifier 105 is connected to the peak detector 107. Therefore, the peak of the negative output, or the bottom of the positive output, of the preamplifier 102 is compared with the output voltage of the average detector 106 by the amplifier 108. The differential voltage between the peak voltage and the average voltage is output to the preamplifier 102 as an offset adjustment signal, so that a peak of the negative output and a bottom of the positive output of the preamplifier 102 are kept constant by the feedback loop.

Figure 5:
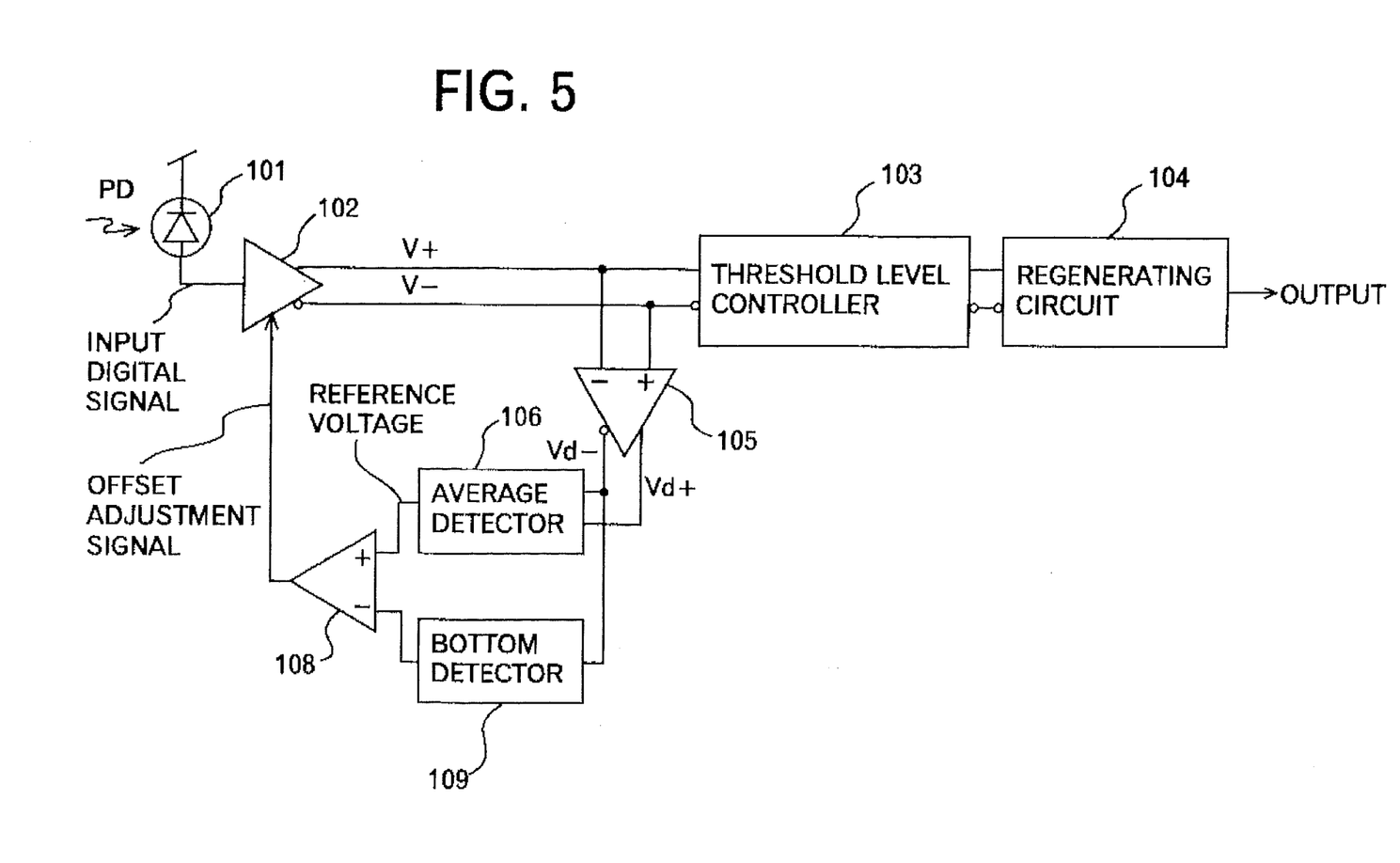
FIG. 5 is a block diagram illustrating the structure of an optical receiver employing a second embodiment according to the invention.

As illustrated in FIG. 5, a bottom detector 109 may be employed instead of the peak detector 107 of FIG. 4. In this case, the bottom detector 109 should receive a negative output of the booster amplifier 105. In such an offset control circuit, the same operation as in FIG. 4 can be obtained by the differential input amplifier 108 comparing a bottom value with an average value (a reference value).

Figure 6:
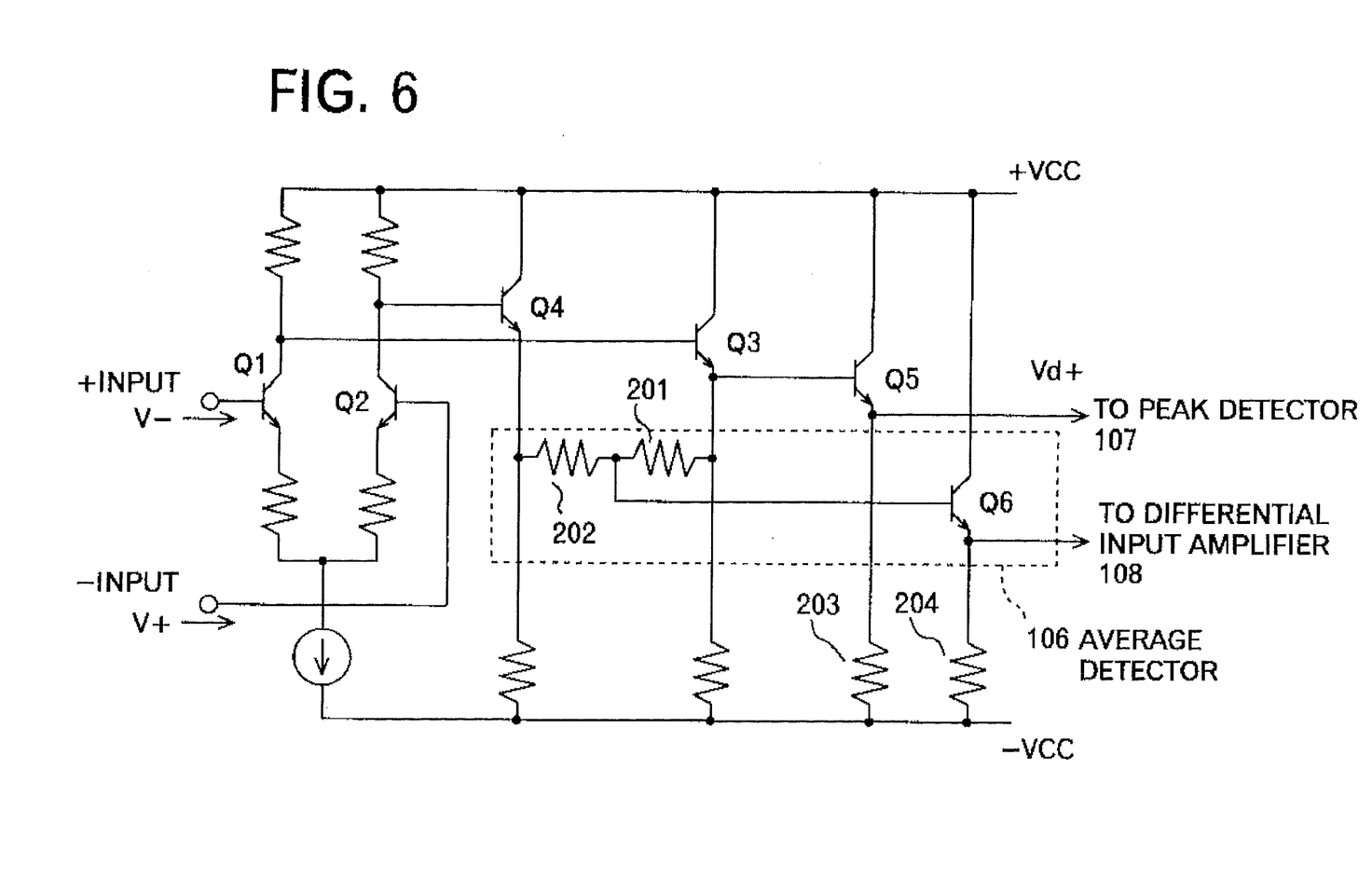
FIG. 6 is a circuit diagram illustrating a first configuration comprising the booster amplifier and the average detector used in the first embodiment of the invention.

Referring to FIG. 6, the average detector 106 enclosed by a broken line is incorporated in the booster amplifier 105. The negative output V− and the positive output V+ of the preamplifier 102 are applied to the bases of transistors Q1 and Q2, respectively. The transistors Q1 and Q2 forms a differential amplifier in the input stage of the booster amplifier 105. The respective collectors of transistors Q1 and Q2 are connected to the bases of transistors Q3 and Q4. The positive output stage comprises a Darlington pair of transistors Q4 and Q5. The emitter of the transistor Q5 is connected to the power supply -Vcc via a resistor 203. The positive output Vd+ is output to the peak detector 107.

In the average detector 106, a voltage divider is comprised of resistors 201 and 202 having the same resistance connected in series. The both ends of the voltage divider are connected to the respective emitters of transistors Q3 and Q4, and the tap of the voltage divider is connected to the base of level shift transistor Q6. The emitter of the transistors Q6 is connected to the power supply -Vcc via a resistor 204 having the same resistance as the resistor 203. The transistor 204 forms an emitter follower circuit.

The average voltage of the outputs of transistors Q3 and Q4 is generated by the voltage divider, and is then transferred from the tap through a level shift transistor Q6 to the positive input terminal of the differential input amplifier 108. Since the characteristics of the transistors Q5 and Q6 are equal and the resistance values of the resistors 203 and 204 are also equal, the base-emitter voltage of the transistor Q5 is equal to that of the transistor Q6 independent of variation of power supply voltage or ambient temperature. Therefore, the output voltage of the average detector 106 is equal to the output bias voltage of the booster amplifier 105 independent of variation of power voltage or ambient temperature. Since the peak detector 107 is configured as a feedback circuit, the output bias voltage of the peak detector 107 follows the positive output voltage Vd+ of the booster amplifier 105 or the emitter potential of the transistor Q5.

Consequently, the power voltage and temperature variation characteristics of the output bias voltage of the peak detector 107 are equal to those of the output voltage of the average detector 106, and there is little output offset variation depending on power voltage and ambient temperature characteristics stemming from internal offset variation of the offset control circuit.

The average detector 106 needs only three elements; transistor Q6 and resistors 201, 202. Therefore, there is no need to provide the offset control circuit with a complicated circuit for compensating output of the preamplifier 102 for voltage variation due to power voltage and temperature variation. Therefore, as shown in FIG. 9C, a proper output waveform of the preamplifier 102 is obtained with small number of circuit elements.

Figure 7:
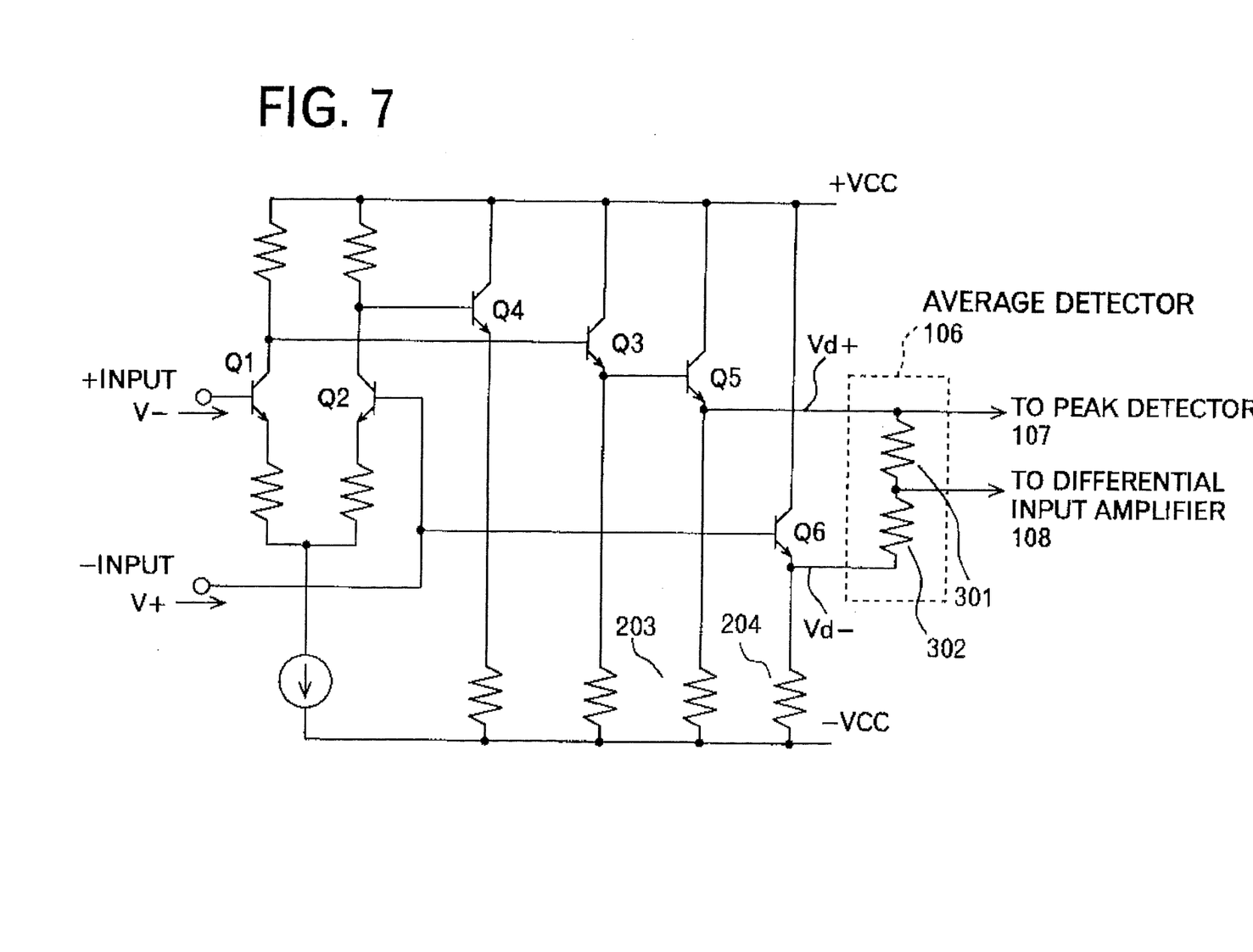
FIG. 7 is a circuit diagram illustrating a second configuration comprising the booster amplifier and the average detector used in the first embodiment of the invention.
Figure 8:
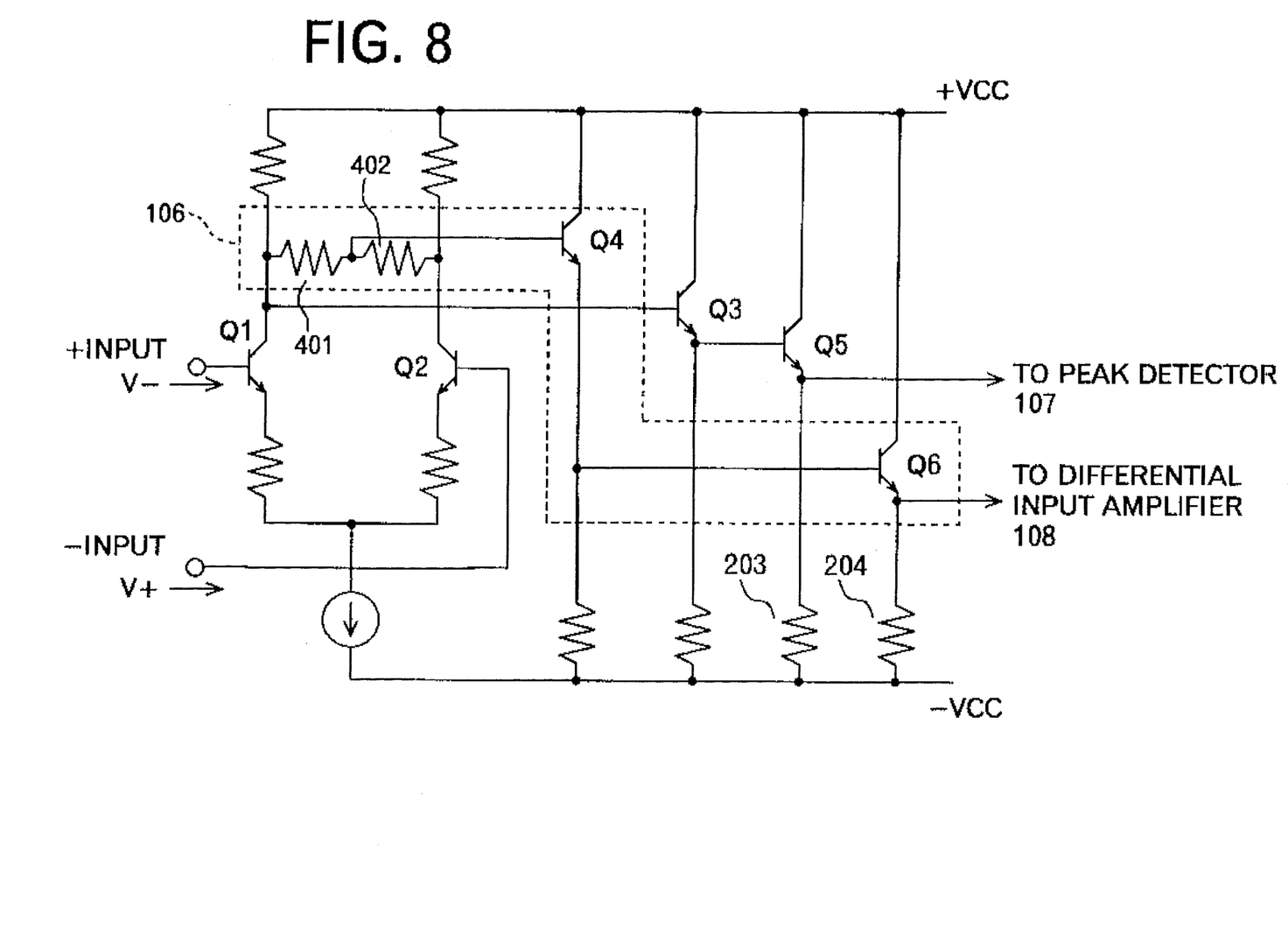
FIG. 8 is a circuit diagram illustrating a third configuration comprising the booster amplifier and the average detector used in the first embodiment of the invention.

Although the voltage divider of the average detector 106 is inserted in the middle of the output stage of the booster amplifier 105 as shown in FIG. 6, it may be inserted into the output part of the booster amplifier 105 as shown in FIG. 7 or its input stage as shown in FIG. 8.

Referring to FIG. 7, the voltage divider is comprised of two resistors 301 and 302 having the same resistance value with the respective ends thereof being connected to the emitters of the transistors Q5 and Q6. The positive output stage is comprised of a Darlington pair of transistors Q3 and Q5, and the negative output stage is comprised of a Darlington pair of transistors Q4 and Q6.

Referring to FIG. 8, the voltage divider is comprised of two resistors 401 and 402 having the same resistance value with the respective ends thereof being connected to the collectors of the input differential transistors Q1 and Q2.

As described above, the present invention provides an automatic offset control circuit for a digital receiver capable of receiving a burst signal wherein the influence of the internal offset is cancelled out and the number of required circuit elements is small.

What is claimed is:

1. An automatic offset control circuit for a digital receiver, comprising:

a preamplifier for amplifying an input digital signal in order to output first differential signals comprising a positive output signal and a negative output signal, the preamplifier having an offset adjustment function;

first means for generating second differential signals which comprise a first signal and a second signal corresponding to the positive output signal and the negative output signal, respectively, of said preamplifier;

reference generating means for generating a reference value responsive to the second differential signals, the reference value being obtained by averaging the first signal and the second signal;

peak detecting means for detecting a peak value of the second signal corresponding to the negative output signal;

second means for generating an offset adjustment signal by differencing the reference value and the peak value; and offset adjustment means for adjusting an output offset of the preamplifier responsive to the offset adjustment signal.

2. An automatic offset control circuit as set forth in claim 1, wherein the reference generating means comprises a resistor circuit comprising two resistors connected in series, the resistors having the same resistance value, the resistor circuit receiving the first signal and the second signal at respective ends of the resistor circuit, and the resistor circuit generating the reference value from a tap thereof.

3. An automatic offset control circuit for a digital receiver, comprising:

a preamplifier for amplifying an input digital signal to output first differential signals comprising a positive output signal and a negative output signal, the preamplifier having an offset adjustment function;

first means for generating second differential signals which comprise a first signal and a second signal corresponding to the positive output signal and the negative output signal, respectively;

reference generating means for generating a reference value based on the second differential output signals, the reference value being obtained by averaging the first signal and the second signal;

bottom detecting means for detecting a bottom value of the first signal corresponding to the positive output signal;

second means for generating an offset adjustment signal by differencing the reference value and the bottom value; and offset adjustment means for adjusting an output offset of the preamplifier according to the offset adjustment signal.

4. An automatic offset control circuit as set forth in claim 3, wherein the reference generating means comprises a resistor circuit comprising two resistors connected in series, the resistors having the same resistance value, the resistor circuit receiving the first signal and the second signal at respective ends of the resistor circuit, and the resistor circuit generating the reference value from a tap thereof.

5. An automatic offset control circuit for a digital receiver, comprising:

a preamplifier for amplifying an input digital signal to output first differential signals comprising a positive output signal and a negative output signal, the preamplifier having an offset adjustment function;

a first differential amplifier for generating second differential signals which comprise a first signal and a second signal corresponding to the positive output signal and the negative output signal, respectively;

an average detector for detecting an average value of the first signal and the second signal;

a peak detector for detecting a peak value of the second signal corresponding to the negative output signal; and a second differential amplifier for generating an offset adjustment signal by differencing the reference value and the peak value and for outputting the offset adjustment signal to the preamplifier.

6. An automatic offset control circuit as set forth in claim 5, wherein the average detector comprises a voltage divider comprising two resistors having the same resistance value.

7. An automatic offset control circuit for a digital receiver, comprising;

a preamplifier for amplifying an input digital signal to output first differential signals comprising a positive output signal and a negative output signal, the preamplifier having an offset adjustment function;

a first differential amplifier for generating second differential signals which comprise a first signal and a second signal corresponding to the positive output signal and the negative output signal, respectively;

an average detector for detecting an average value of the first signal and the second signal;

a bottom detector for detecting a bottom value of the first signal corresponding to the positive output signal; and a second differential amplifier for generating an offset adjustment signal by differencing the reference value and the bottom value and for outputting the offset adjustment signal to the preamplifier.

8. An automatic offset control circuit as set forth in claim 7, wherein the average detector comprises a voltage divider comprising two resistors having the same resistance value.

9. An automatic offset control circuit for a digital receiver, comprising;

a preamplifier for amplifying an input digital signal to output first differential signals comprising a positive output signal and a negative output signal, the preamplifier having an offset adjustment function;

amplifying means for amplifying a difference between the positive output signal and the negative output signal to generate second differential signals comprising a first signal and a second signal corresponding to the positive output signal and the negative output signal, respectively;

average detecting means for detecting an average value of the first signal and the second signal;

peak detecting means for detecting a peak value of the second signal corresponding to the negative output signal;

differencing means for differencing the reference value and the bottom value to generating an offset adjustment signal; and offset adjustment means for adjusting an output offset voltage of the preamplifier according to the offset adjustment signal.

10. An automatic offset control circuit as set forth in claim 9 wherein the average detecting means comprises a voltage divider comprising two resistors having the same resistance value.

11. An automatic offset control circuit as set forth in claim 10 wherein the amplifying means comprises a differential input/output amplifier incorporating the voltage divider.

12. An automatic offset control method for a digital receiver comprising a preamplifier for amplifying an input digital signal to generate first differential signals comprising a positive output signal and a negative output signal, the preamplifier having an offset adjustment function, the method comprising the steps of:

generating second differential signals which comprise a first signal and a second signal corresponding to the positive output signal and the negative output signal, respectively;

generating a reference value based on the second differential output signals, the reference value being obtained by averaging the first signal and the second signal;

detecting a peak value of the second signal corresponding to the negative output signal;

generating an offset adjustment signal by differencing the reference value and the peak value; and adjusting an output offset of the preamplifier according to the offset adjustment signal.

13. An automatic offset control method for a digital receiver comprising a preamplifier for amplifying an input digital signal to generate first differential signals comprising a positive output signal and a negative output signal, the preamplifier having an offset adjustment function, the method comprising the steps of:

generating second differential signals which comprise a first signal and a second signal corresponding to the positive output signal and the negative output signal, respectively;

generating a reference value based on the second differential output signals, the reference value being obtained by averaging the first signal and the second signal;

detecting a bottom value of the first signal corresponding to the positive output signal;

generating an offset adjustment signal by differencing the reference value and the bottom value; and adjusting an output offset of the preamplifier according to the offset adjustment signal.

* * * * *